(12) United States Patent
Nomura

(10) Patent No.: US 10,442,178 B2
(45) Date of Patent: Oct. 15, 2019

(54) INFORMATION PROCESSING APPARATUS, INFORMATION PROCESSING METHOD, AND THREE-DIMENSIONAL SOLID OBJECT

(71) Applicant: RICOH COMPANY, LTD., Tokyo (JP)

(72) Inventor: Toshiaki Nomura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 268 days.

(21) Appl. No.: 14/950,101

(22) Filed: Nov. 24, 2015

(65) Prior Publication Data

US 2016/0151981 A1    Jun. 2, 2016

(30) Foreign Application Priority Data

Dec. 1, 2014 (JP) ................................. 2014-243496

(51) Int. Cl.
*B33Y 50/02* (2015.01)
*G05B 19/4099* (2006.01)
(Continued)

(52) U.S. Cl.
CPC ............ *B33Y 50/02* (2014.12); *B29C 64/386* (2017.08); *B29C 67/00* (2013.01);
(Continued)

(58) Field of Classification Search
CPC . B29C 67/0088; B29C 19/4099; B29C 67/00; B33Y 50/02; G05B 19/4099; H04N 1/32144
See application file for complete search history.

(56) References Cited

U.S. PATENT DOCUMENTS 7,261,542 B2 * 8/2007 Hickerson .............. B33Y 10/00
264/308
8,874,248 B2   10/2014 Young et al.
(Continued)

FOREIGN PATENT DOCUMENTS

CN    102982579 A    3/2013
CN    103473021 A   12/2013
(Continued)

OTHER PUBLICATIONS

Chinese official action (and English translation thereof) dated May 27, 2017 in connection with corresponding Chinese patent application No. 201510852695.0.
(Continued)

*Primary Examiner* — Brian W Wathen
*Assistant Examiner* — Brian T McMenemy
(74) *Attorney, Agent, or Firm* — Oblon, McClelland, Maier & Neustadt, L.L.P.

(57) ABSTRACT

An information processing apparatus includes a first generator, a second generator, and a shaping controller. The first generator generates first shaping data for shaping a first solid object that represents identification information for a shaping unit for shaping a solid object, in the form of a three-dimensionally shaped pattern in which a plurality of layer regions are stacked and at least adjacent ones of the layer regions differ from each other in feature quantities. The second generator generates third shaping data that includes second shaping data for shaping a second solid object serving as a shaping target and also includes the first shaping data, and that is used for shaping a third solid object in which the first solid object is arranged in the second solid object. The shaping controller controls the shaping unit to shape the third solid object using the third shaping data.

12 Claims, 13 Drawing Sheets

(51) Int. Cl.
*B29C 67/00* (2017.01)
*H04N 1/32* (2006.01)
*B29C 64/386* (2017.01)
*G05B 19/4097* (2006.01)

(52) U.S. Cl.
CPC ..... *G05B 19/4099* (2013.01); *H04N 1/32144* (2013.01); *G05B 2219/35134* (2013.01); *G05B 2219/49007* (2013.01)

(56) References Cited

U.S. PATENT DOCUMENTS

| | | | |
|---|---|---|---|
| 9,440,397 B1* | 9/2016 | Fly | B33Y 10/00 |
| 2008/0082301 A1* | 4/2008 | Haskell | G06F 17/50 |
| | | | 703/1 |
| 2011/0190936 A1* | 8/2011 | Koeder | B23Q 17/2233 |
| | | | 700/259 |
| 2011/0205583 A1 | 8/2011 | Young et al. | |
| 2011/0286624 A1 | 11/2011 | Choi et al. | |
| 2012/0174527 A1* | 7/2012 | Hinshaw | B25C 7/00 |
| | | | 52/745.13 |
| 2013/0155047 A1 | 6/2013 | Williams et al. | |
| 2014/0023996 A1* | 1/2014 | Finn | G09B 25/00 |
| | | | 434/72 |
| 2014/0121813 A1* | 5/2014 | Schmehl | B29C 47/92 |
| | | | 700/119 |
| 2014/0136156 A1* | 5/2014 | Divekar | G06F 17/50 |
| | | | 703/1 |
| 2014/0163717 A1* | 6/2014 | Das | B22F 3/1055 |
| | | | 700/119 |
| 2014/0340400 A1 | 11/2014 | Takeguchi et al. | |
| 2015/0165792 A1* | 6/2015 | Kudo | B41J 11/663 |
| | | | 347/16 |
| 2015/0183167 A1* | 7/2015 | Molinari | B29C 67/0088 |
| | | | 425/167 |
| 2016/0067927 A1* | 3/2016 | Voris | B29C 67/0088 |
| | | | 700/98 |

FOREIGN PATENT DOCUMENTS

| | | |
|---|---|---|
| EP | 1437882 A1 | 7/2004 |
| GB | 2478067 A | 8/2011 |
| JP | 4611629 | 10/2010 |
| JP | 4456850 | 2/2012 |
| JP | 2013-86289 | 5/2013 |
| WO | WO 03/026876 A2 | 4/2003 |

OTHER PUBLICATIONS

Apr. 29, 2016 European search report in corresponding European Patent Application No. 15196801.3.

* cited by examiner (A)

(B)

(A)

(B)

ial significance of this invention will be
INFORMATION PROCESSING APPARATUS, INFORMATION PROCESSING METHOD, AND THREE-DIMENSIONAL SOLID OBJECT

CROSS-REFERENCE TO RELATED APPLICATION

The present application claims priority to and incorporates by reference the entire contents of Japanese Patent Application No. 2014-243496 filed in Japan on Dec. 1, 2014.

BACKGROUND OF THE INVENTION

1. Field of the Invention

The present invention relates to an information processing apparatus, an information processing method and a three-dimensional solid object.

2. Description of the Related Art

Apparatuses are known that form on a recording medium a traceable pattern image of a device number, in addition to a formation target image in order to prevent fraudulent printing, for example (refer to Japanese Patent No. 4456850, for example). Techniques have been disclosed for shaping a three-dimensional solid object instead of a two-dimensional image (refer to Japanese Patent No. 4611629, for example).

However, no attempt has heretofore been made to embed, into the three-dimensional solid object, identification information that is hardly removable and allows identification of a shaping unit of a shaping apparatus or the like that has shaped the solid object.

SUMMARY OF THE INVENTION

It is an object of the present invention to at least partially solve the problems in the conventional technology.

According to an embodiment, there is provided an information processing apparatus that includes: a first generator configured to generate first shaping data for shaping a first solid object representing identification information for a shaping unit that shapes a solid object, in a form of a three-dimensionally shaped pattern in which a plurality of layer regions are stacked and at least adjacent ones of the layer regions differ from each other in feature quantities; a second generator configured to generate third shaping data that includes second shaping data for shaping a second solid object serving as a shaping target and also includes the first shaping data, the third shaping data being used for shaping a third solid object in which the first solid object is arranged in the second solid object; and a shaping controller configured to control the shaping unit to shape the third solid object using the third shaping data.

According to another embodiment, there is provided an information processing method that includes: generating first shaping data for shaping a first solid object representing identification information for a shaping unit that shapes a solid object, in a form of a three-dimensionally shaped pattern in which a plurality of layer regions are stacked and at least adjacent ones of the layer regions differ from each other in feature quantities; generating third shaping data that includes second shaping data for shaping a second solid object serving as a shaping target and also includes the first shaping data, and that is used for shaping a third solid object in which the first solid object is arranged in the second solid object; and controlling the shaping unit to shape the third solid object using the third shaping data.

According to still another embodiment, there is provided a three-dimensional solid object that includes: a second solid object; and a first solid object that is arranged in the second solid object and represents identification information for a shaping unit that shapes a solid object, in a form of a three-dimensionally shaped pattern in which a plurality of layer regions are stacked and at least adjacent ones of the layer regions differ from each other in feature quantities.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of another shaping system;

DETAILED DESCRIPTION OF THE PREFERRED EMBODIMENTS

The following describes in detail embodiments of an apparatus, a method, and a computer program for information processing, and a three-dimensional solid object according to the present invention, with reference to the accompanying drawings.

First Embodiment

Figure 1:
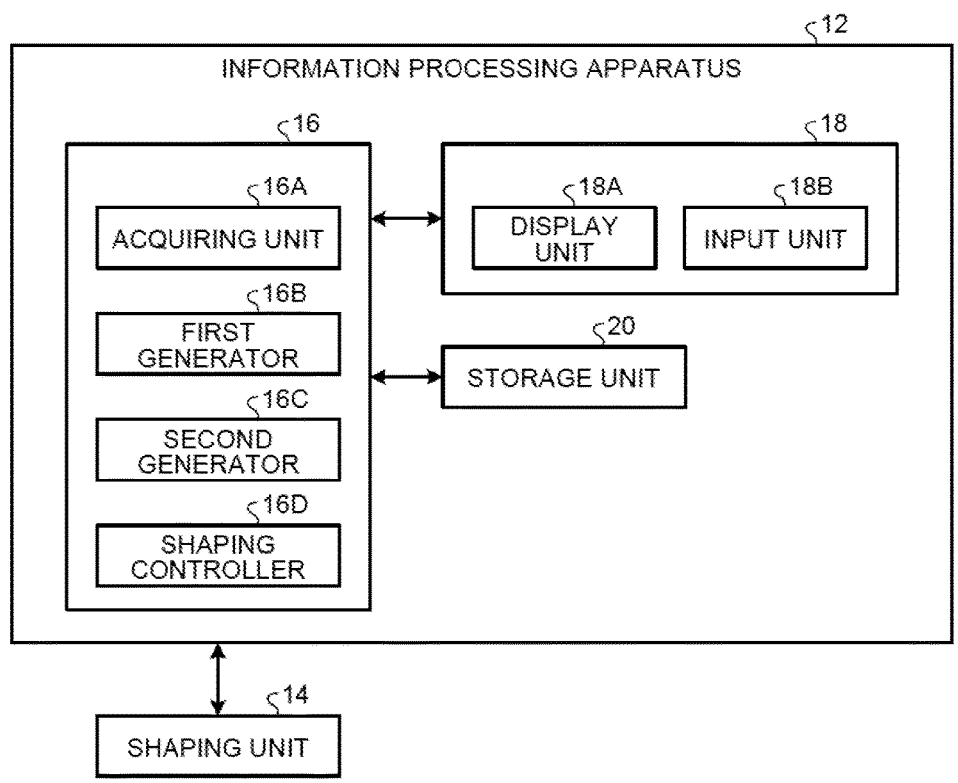
FIG. 1 is a diagram illustrating an example of a shaping system.

FIG. 1 is a diagram illustrating an example of a shaping system 10.

The shaping system 10 includes an information processing apparatus 12 and a shaping unit 14. The information processing apparatus 12 and the shaping unit 14 are connected so as to be capable of transmitting and receiving data and signals to and from each other.

The shaping unit 14 produces a solid object (but not excluding a hollow object or soft material). The shaping unit 14 is a commonly known three-dimensional printer (3D printer). The shaping unit 14 may be any device that uses any known shaping technique, such as a stereolithography technique, a fused deposition modeling technique, a powder sintering technique, a binder jetting technique (plaster powder method), a laminated object manufacturing technique, and an inkjet method.

The information processing apparatus 12 creates shaping data to be used by the shaping unit 14, and controls the shaping unit 14. The shaping data is model data used when the shaping unit 14 shapes the solid object. The shaping unit 14 uses the shaping data to shape the solid object represented by the shaping data. In the present embodiment, the information processing apparatus 12 uses first shaping data, second shaping data, and third shaping data as the shaping data. Details of these pieces of shaping data will be described later.

The information processing apparatus 12 includes a control unit 16, a user interface (UI) unit 18, and a storage unit 20. The control unit 16 is connected to the UI unit 18 and the storage unit 20 so as to be capable of transmitting and receiving signals and data to and from the units 18 and 20.

The storage unit 20 includes a storage medium or media, such as a hard disk drive (HUD) device and/or an internal memory. The storage unit 20 stores various types of data. In the present embodiment, the storage unit 20 stores identification information for the shaping unit 14 in advance.

The UI unit 18 includes a display unit 18A and an input unit 18B.

The display unit 18A displays various images. The display unit 18A is, for example, a known display device, such as a liquid crystal display (LCD) or an organic electroluminescence (EL) display.

The input unit 18B is a unit for receiving various input operations from a user. The input unit 18B includes, for example, a mouse, buttons, a remote control, a keyboard, and a voice recognition device including a microphone.

The display unit 18A and the input unit 18B may be configured in an integrated manner. Specifically, the display unit 18A and the input unit 18B may be configured as the UI unit 18 having both input and display functions. Examples of the UI unit 18 include, but are not limited to, an LCD with a touch panel.

The control unit 16 is a computer including, for example, a central processing unit (CPU), a read-only memory (ROM), and a random access memory (RAM). The control unit 16 controls the whole of the information processing apparatus 12. The control unit 16 may be circuitry other than the CPU.

The control unit 16 includes an acquiring unit 16A, a first generator 16B, a second generator 16C, and a shaping controller 16D. One, some, or all of the acquiring unit 16A, the first generator 16B, the second generator 16C, and the shaping controller 16D may be implemented by causing a processing device, such as the CPU, to execute a computer program, that is, by software, or may be implemented by hardware, such as an integrated circuit (IC), or may otherwise be implemented by using both software and hardware.

The acquiring unit 16A acquires the second shaping data, for example, from an external device, via a communication unit. The acquiring unit 16A may acquire the second shaping data from the storage unit 20.

The second shaping data is model data for shaping a second solid object serving as a shaping target using the shaping unit 14. The second solid object serving as the shaping target is a solid object desired by the user.

Examples of the data format of the second shaping data include, but are not limited to, the Standard Triangulated Language (STL) format (so-called stereolithography), the Polygon File Format (PLY), and the Virtual Reality Modeling Language (VRML) format.

The control unit 16 may generate the second shaping data according to an operating instruction by the user via the UI unit 18 using known three-dimensional (3D) computer aided design (CAD) software or known 3D computer graphics (CG) software. In this case, the control unit 16 only needs to generate the second shaping data of the second solid object according to the operating instruction by the user via the UI unit 18, and the acquiring unit 16A only needs to acquire the generated second shaping data.

The first generator 16B generates the first shaping data for shaping a first solid object. The first solid object is a solid object representing the identification information for the shaping unit 14 in the form of a three-dimensionally shaped pattern in which a plurality of layer regions are stacked and at least adjacent ones of the layer regions differ from each other in feature quantities.

The feature quantities are values representing visually or mechanically distinguishable features of the adjacent layer regions. Specifically, the feature quantities are at least one of the thickness, the mass density, the color density, and the constituent material of each of the layer regions.

The thickness represents the thickness in the stacking direction of each of the layer regions. The mass density represents the mass density of the each of the layer regions. For example, the layer regions only need to be provided with one or a plurality of voids to vary the mass density between the adjacent layer regions. The color density represents at least either of the color and the density of each of the layer regions. The constituent material represents, for example, the type of the material and the percentage of the material contained in each of the layer regions.

Thus, at least adjacent layer regions of the layer regions in the first solid object differ from each other in at least one of thickness, mass density, color density, and constituent material.

The number of layers in the layer regions of the first solid object only needs to be two or larger.

FIGS. 2 to 5 illustrate examples of a first solid object 34.

Figure 2:
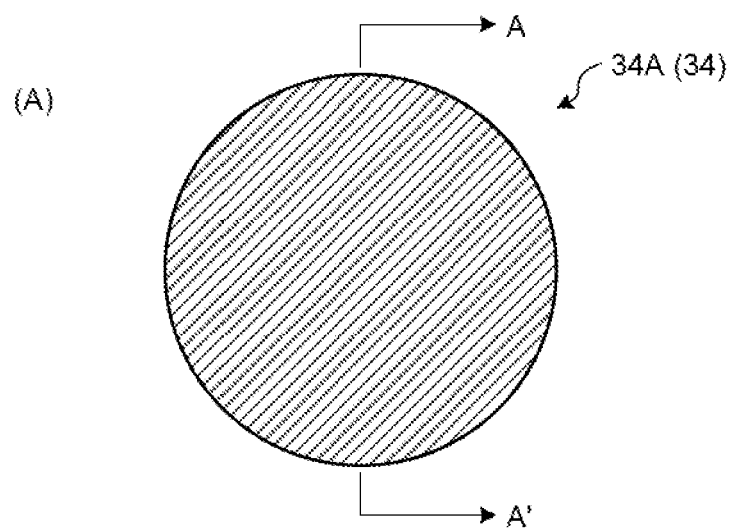
FIG. 2 illustrates an example of a first solid object.
Figure 2:
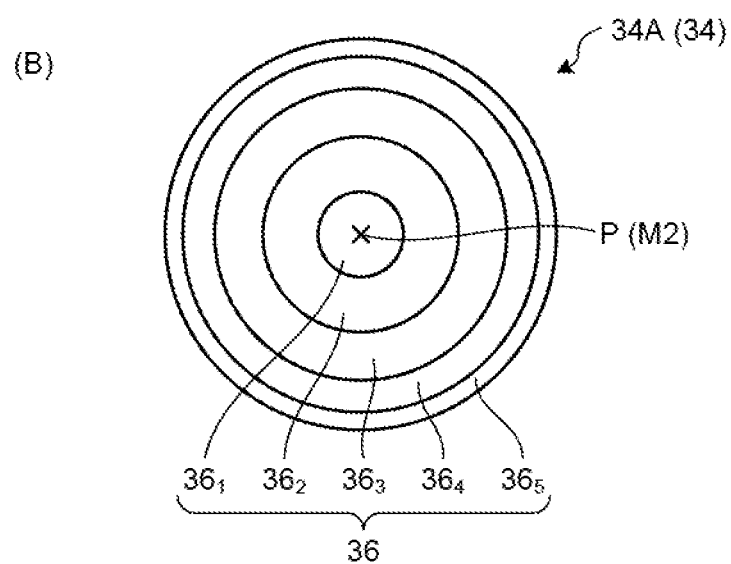

FIG. 2 illustrates an example of a first solid object 34A having a spherical outer shape. As illustrated in (A) in FIG. 2, the outer shape of the first solid object 34A is, for example, spherical. In FIG. 2, (B) is a sectional view (A-A' sectional view of (A)) passing through a center position P of the first solid object 34A.

As illustrated in (B) in FIG. 2, the section containing the center position P of the first solid object 34A is made up of a plurality of concentric layer regions 36 (layer region $36_1$ to layer region $36_5$) centered on the center position P. That is, the first solid object 34A has a structure in which a plurality of spheres with different radii centered (concentric) on the center position P are laminated. As described above, at least adjacent layer regions 36 of the layer regions 36 (layer region $36_1$ to layer region $36_5$) differ from each other in feature quantities.

In FIG. 2, (B) illustrates an example of a case in which adjacent ones of the layer regions 36 in the first solid object 34A differ from each other in thickness.

Figure 3:
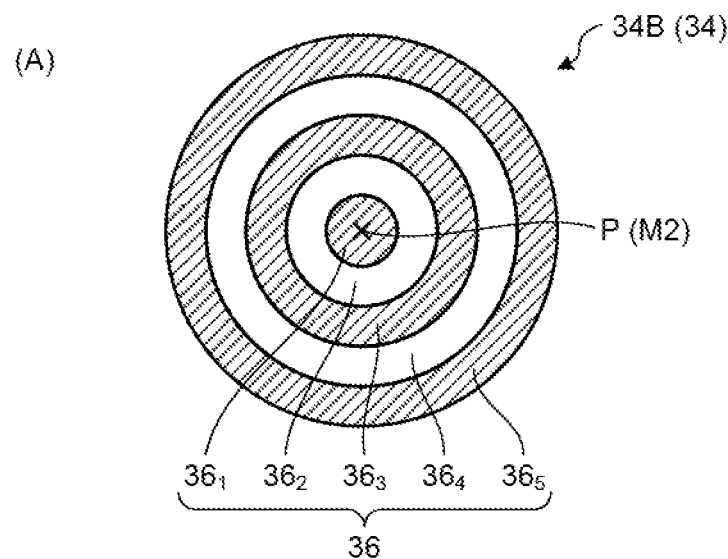
FIG. 3 illustrates other examples of the first solid object.
Figure 3:
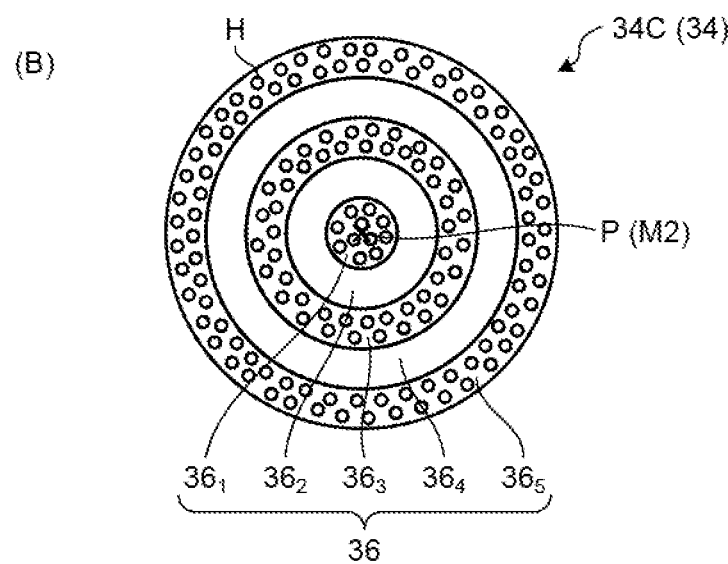

In FIG. 3, (A) illustrates another example of the first solid object 34 (first solid object 34B) in which adjacent ones of the layer regions 36 differ from each other in color density. The section containing the center position P of the first solid object 34 is made up of the concentric layer regions 36 (layer region $36_1$ to layer region $36_5$) centered on the center position P. Adjacent ones of the layer regions 36 (layer region $36_1$ to layer region $36_5$) in the first solid object 34B differ from each other in color density.

In FIG. 3, (B) illustrates still another example of the first solid object 34 (first solid object 34C) in which adjacent ones of the layer regions 36 differ from each other in mass density. The section containing the center position P of the first solid object 34C is made up of the concentric layer regions 36 (layer region $36_1$ to layer region $36_5$) centered on the center position P. Adjacent one of the layer regions 36 (layer region $36_1$ to layer region $36_5$) in the first solid object 34C differ from each other in mass density. In detail, adjacent ones of the layer regions 36 in the first solid object 34C differ from each other in at least either of the number of voids H per unit area and the size of voids H.

A cut surface obtained by cutting through the center position P of the first solid object 34 is read by the visually recognizing user, or by a mechanically recognizing detection unit. In this manner, the identification information for the shaping unit 14 represented by the three-dimensionally shaped pattern of the first solid object 34 is recognized.

For this purpose, the first solid object 34 preferably includes a mark indicating the center position P (refer to a mark M2 in FIGS. 2 and 3). In other words, the first generator 16B preferably generates the first shaping data of the first solid object 34 including the mark M2 for the center position P.

The mark M2 only needs to differ from regions adjacent to the mark M2 in the first solid object 34 in feature quantities.

The examples illustrated in FIGS. 2 and 3 represent the case in which the outer shape of the first solid object 34 is spherical. In the examples illustrated in FIGS. 2 and 3, the section containing the center position P of the first solid object 34 is constituted by the concentric layer regions 36 centered on the center position P.

However, the outer shape of the first solid object 34 is not limited to a spherical shape. The section containing the center position P of the first solid object 34 only needs to be laminated with the layer regions 36, of which at least adjacent ones of the layer regions 36 differ from each other in feature quantities, and the layer regions 36 are not limited to concentric layers.

Figure 4:
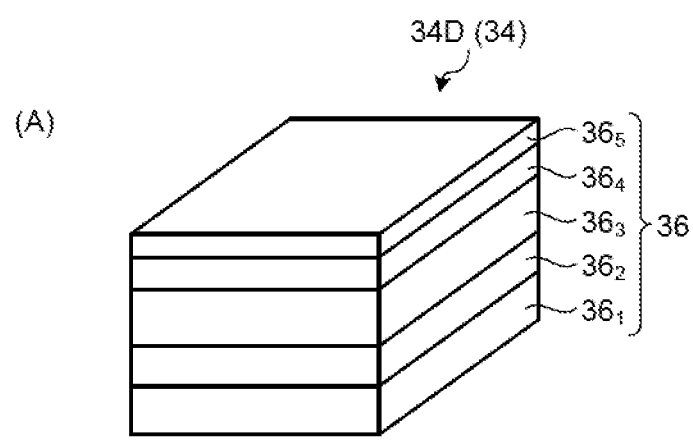
FIG. 4 illustrates still other examples of the first solid object.
Figure 4:
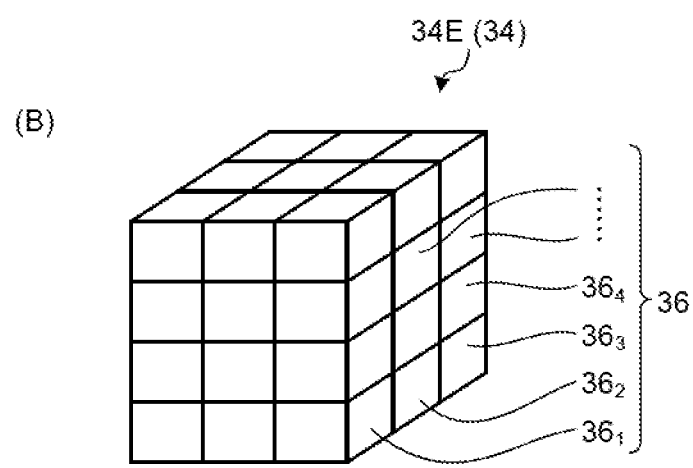

FIG. 4 illustrates a case in which the outer shape of the first solid object 34 is cubic.

A first solid object 34D illustrated in (A) in FIG. 4 has a configuration in which the layer regions 36 (layer region $36_1$ to layer region $36_5$) having plate-like shapes are stacked. The outer shape of the first solid object 34D is cubic. In this manner, the outer shape of the first solid object 34 (first solid object 34D) may be cubic. The first solid object 34 (first solid object 34D) may have a configuration in which the plate-like layer regions 36 are stacked.

The layer regions 36 in the first solid object 34 are not limited to be stacked in one direction. The layer regions 36 in the first solid object 34 may have a configuration in which the layer regions 36 are stacked, for example, in a plurality of different directions.

A first solid object 34E illustrated in (B) in FIG. 4 has a configuration in which the layer regions 36 (layer region $36_1$ to layer region $36_n$) (n is an integer of two or larger) are stacked in three mutually orthogonal directions. In this manner, the layer regions 36 in the first solid object 34 (first solid object 34E) are not limited to be stacked in one direction.

Moreover, the first solid object 34 may further include the voids H arranged with spaces therebetween along at least one of boundaries between adjacent ones of the layer regions 36 and an outer circumference of the first solid object 34.

Figure 5:
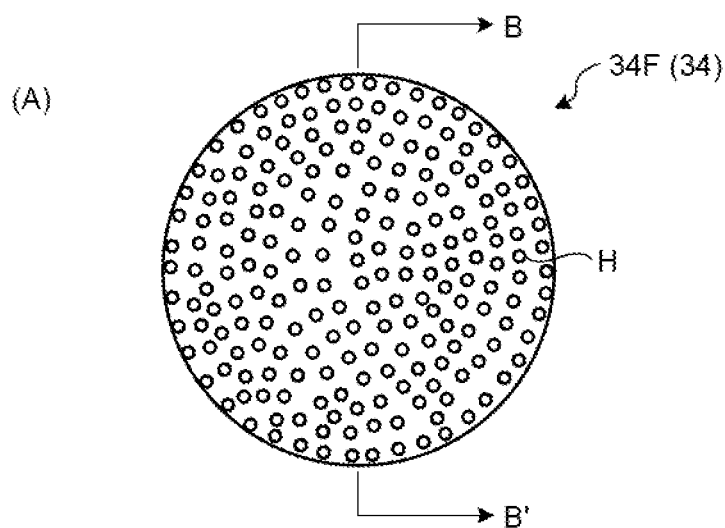
FIG. 5 illustrates still another example of the first solid object.
Figure 5:
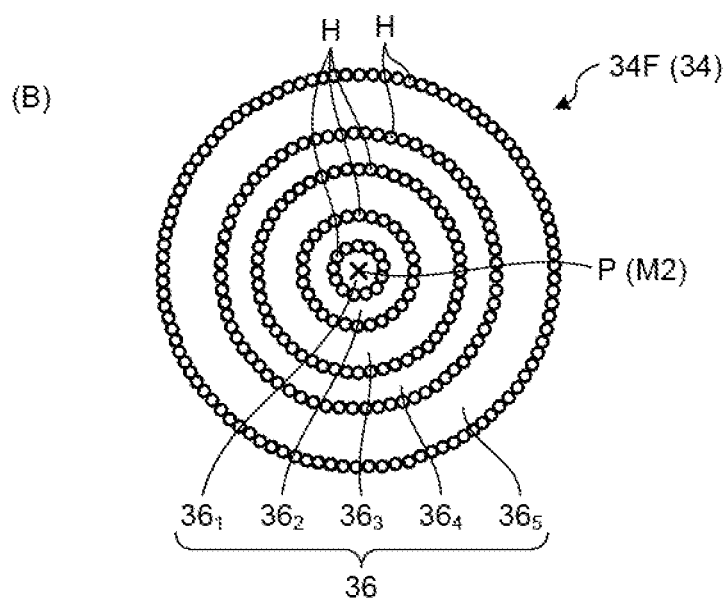

FIG. 5 illustrates still another example of the first solid object 34 (first solid object 34F) that has the voids H on the boundaries thereof. In FIG. 5, (A) is an external view of the first solid object 34F. In FIG. 5, (B) is a sectional view (B-B' sectional view of (A)) passing through the center position P of the first solid object 34F.

As illustrated in FIG. 5, the first solid object 34F may have a configuration in which the voids H are arranged with spaces therebetween along the outer circumference of the first solid object 34F and the boundaries between adjacent ones of the layer regions 36 in the first solid object 34F. The voids H arranged along the outer circumference of the first solid object 34F preferably have a uniform size and a uniform mass density per unit area. The voids H arranged along the boundaries between adjacent ones of the layer regions 36 preferably have a uniform size and a uniform mass density per unit area. The voids H arranged along the outer circumference of the first solid object 34F and the boundaries between adjacent ones of the layer regions 36 may have the same size and the same mass density per unit area, or may have different sizes and different mass densities per unit area.

As described above, the outer shape of the first solid object 34 is not limited. However, the outer shape of the first solid object 34 is preferably spherical. The spherical shape of the first solid object 34 can give the first solid object 34 a higher strength than in the case of non-spherical shape. In particular, if the first solid object 34 contains the voids H inside, the outer shape of the first solid object 34 is preferably spherical from the viewpoint of strength improvement.

Referring back to FIG. 1, the first generator 16B reads the identification information for the shaping unit 14 stored in the storage unit 20, and generates the first shaping data of the first solid object 34. The storage unit 20 should store in advance the outer shape of the first solid object 34, the number of layers of the layer regions 36, the shapes of the layer regions 36, the types of feature quantities different between adjacent ones of the layer regions 36, the feature quantities of the layer regions 36, and the sizes of the first solid object 34 (including the sizes and positional relations of the layer regions 36).

For example, the storage unit 20 stores in advance first information in which the identification information for the shaping unit 14 is associated with the outer shape of the first solid object 34, the number of layers of the layer regions 36, the shapes of the layer regions 36, the types of feature quantities different between adjacent ones of the layer regions 36, the feature quantities of the layer regions 36, and the sizes of the first solid object 34 (including the sizes and positional relations of the layer regions 36). In other words, in the present embodiment, the identification information for the shaping unit 14 is represented in the form of the three-dimensionally shaped pattern by the outer shape of the first solid object 34, the number of layers of the layer regions 36, the shapes of the layer regions 36, the types of feature quantities different between adjacent ones of the layer regions 36, the feature quantities of the layer regions 36, and the sizes of the first solid object 34 (including the sizes and positional relations of the layer regions 36.

The feature quantities of the layer regions 36 stored in the storage unit 20 only needs to be set in advance so that the feature quantities of adjacent ones of the layer regions 36 differ from each other. The first information stored in the storage unit 20 may be variable as appropriate according to the operating instruction by the user operating the shaping system 10 via the UI unit 18.

The first generator 16B reads the outer shape of the first solid object 34, the number of layers of the layer regions 36, the shapes of the layer regions 36, the types of feature quantities different between adjacent ones of the layer regions 36, the feature quantities of the layer regions 36, and the sizes of the first solid object 34 (including the sizes and positional relations of the layer regions 36) that are stored in the storage unit 20 and are associated with the identification information for the shaping unit 14 for shaping the shaping target. Then, the first generator 16B generates the first shaping data for shaping the first solid object 34 represented by the outer shape of the first solid object 34, the number of layers of the layer regions 36, the shapes of the layer regions 36, the types of feature quantities different between adjacent ones of the layer regions 36, the feature quantities of the layer regions 36, and the sizes of the first solid object 34 (including the sizes and positional relations of the layer regions 36) that have been read.

If the shaping unit 14 for shaping the shaping target is configured such that some types of feature quantities cannot be realized, the first generator 16B may correct the first information so that such types of feature quantities can be realized by the shaping unit 14. For example, if the shaping unit 14 uses the stereolithography technique or the powder sintering technique, the shaping unit 14 often uses a single color material to perform shaping. In such a case, if one of the types of feature quantities different between adjacent ones of the layer regions 36 included in the first information is the color density, the shaping unit 14 may be incapable of realizing differences in feature quantities between adjacent ones of the layer regions 36 of the first solid object 34 that has been shaped.

In such a case, the first generator 16B only needs to identify the type of feature quantity (for example, thickness or constituent material) that can be realized by the shaping unit 14 for shaping the shaping target, and correct the first information so that the identified type of feature quantity differs between adjacent ones of the layer regions 36. Then, the first generator 16B only needs to use the corrected first information to generate the first shaping data. The first generator 16B only needs to obtain the realizable type of feature quantity from the shaping unit 14, and use the obtained type for the correction.

A known method of 3D CAD software or the like should be used as a method for generating the first shaping data of the first solid object 34 represented by the outer shape of the first solid object 34, the number of layers of the layer regions 36, the shapes of the layer regions 36, the types of feature quantities different between adjacent ones of the layer regions 36, the feature quantities of the layer regions 36, and the sizes of the first solid object 34 (including the sizes and positional relations of the layer regions 36).

The first generator 16B may generate the first shaping data that further includes the mark M2 in the center position P of the first solid object 34. The mark M2 only needs to have feature quantities different from those of, for example, one of the layer regions 36 in the first solid object 34 adjacent to the mark M2. In this case, the first information only needs to further include the position of the mark M2, the shapes, and the feature quantities in a corresponding manner to the identification information for the shaping unit 14.

The following describes the second generator 16C.

The second generator 16C generates the third shaping data that includes the second shaping data and the first shaping data, and that is used for shaping a third solid object in which the first solid object is arranged in the second solid object.

The second shaping data is model data for shaping the second solid object serving as the shaping target of the user using the shaping unit 14. The second generator 16C obtains the second shaping data from the acquiring unit 16A.

The second generator 16C then generates the third shaping data for shaping the third solid object in which the first solid object 34 shaped using the first shaping data generated by the first generator 16B is arranged in the second solid object.

Figure 6:
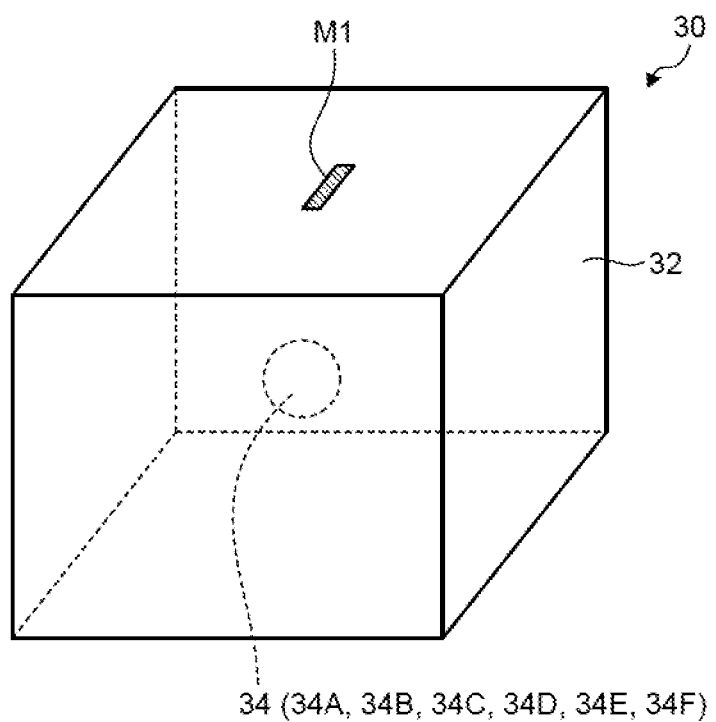
FIG. 6 illustrates an example of a third solid object.

FIG. 6 is a schematic view illustrating an example of a third solid object 30. The third solid object 30 is a solid object in which the first solid object 34 is arranged in a second solid object 32. The shape of the second solid object 32 only needs to be a shape desired by the user, and is not limited to a cubic shape illustrated in FIG. 6. FIG. 6 illustrates the cubic second solid object 32, for simplicity of explanation.

The third solid object 30 has a configuration in which the first solid object 34 is arranged in the second solid object 32. The first solid object 34 only needs to be arranged at a location in the second solid object 32 where the first solid object 34 is not exposed out of the second solid object 32. For example, the second generator 16C generates the third shaping data of the third solid object 30 in which the first solid object 34 is arranged in the second solid object 32 represented by she second shaping data.

The arrangement location of the first solid object 34 in the second solid object 32 may be stored in advance in the storage unit 20. In that case, the arrangement location stored in the storage unit 20 only needs to be a location where the first solid object 34 is not exposed out of the second solid object 32. In this case, the second generator 16C reads the arrangement location from the storage unit 20. Then, the second generator 16C only needs to generate the third shaping data so that the first solid object 34 is located at the read-out arrangement location in the second solid object 32 represented by the second shaping data.

One of the layer regions 36 in the first solid object 34 adjacent to the second solid object 32 preferably has feature quantities different from those of a region in the second solid object 32 adjacent to the layer region 36. Therefore, the second generator 16C preferably generates the third shaping data so that these adjacent regions differ from each other in feature quantities.

The second generator 16C only needs to generate the third shaping data, using the first shaping data, the second shaping data, and the arrangement location, and also using the known method of 3D CAD software or the like.

As described above, the cut surface obtained by cutting through the center position P of the first solid object 34 is read by the visually recognizing user, or by the mechanically recognizing detection unit. In this manner, the identification information for the shaping unit 14 represented by the three-dimensionally shaped pattern of the first solid object 34 is recognized.

For this purpose, the second generator 16C preferably generates the third shaping data of the third solid object 30 in which a marked portion M1 indicating a cutting position passing through the center position P of the first solid object 34 is provided outside the second solid object 32. The marked portion M1 only needs to differ in feature quantities from a region in the second solid object 32 adjacent to the marked portion M1.

Providing the marked portion M1 allows the third solid object 30 to be cut along the cut surface passing through the center position P of the first solid object 34 without being cut through unnecessary locations when the identification information for the shaping unit 14 is visually recognized or read.

Referring back to FIG. 1, the shaping controller 16D uses the third shaping data generated by the second generator 16C to control the shaping unit 14 so as to shape the third solid object 30.

Specifically, the shaping controller 16D outputs the third shaping data generated by the second generator 16C to the shaping unit 14. In this manner, the shaping controller 16D controls the shaping unit 14 so as to shape the third solid object 30.

The shaping unit 14 receives the third shaping data, and then, shapes the third solid object 30 represented by the third shaping data. Thus, the shaping unit 14 shapes, for example, the third solid object 30 illustrated in FIG. 6.

Figure 7:
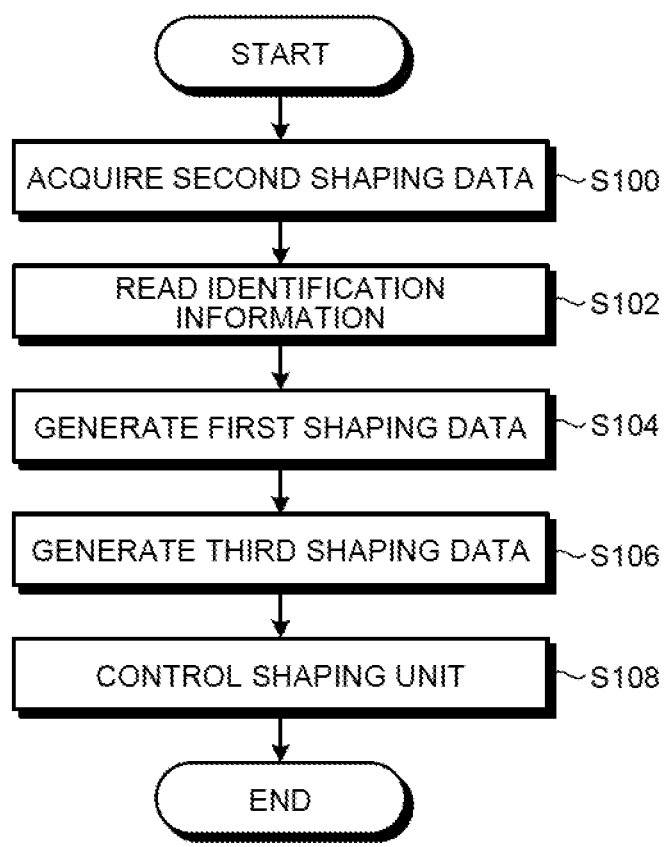
FIG. 7 is a flowchart illustrating an example of a procedure of image processing.

The following describes a procedure of information processing performed by the information processing apparatus 12. FIG. 7 is a flowchart illustrating an example of the procedure of the image processing performed by the information processing apparatus 12.

First, the acquiring unit 16A acquires the second shaping data (Step S100). The acquiring unit 16A acquires the second shaping data, for example, from the external device. The acquiring unit 16A may acquire the second shaping data when the control unit 16 has generated the second shaping data according to the operating instruction by the user via the UI unit 18.

Then, the first generator 16B reads the identification information for the shaping unit 14 from the storage unit 20 (Step S102). The first generator 16B then generates the first shaping data for shaping the first solid object 34 that represents the identification information read at Step S102 in the form of the three-dimensionally shaped pattern in which the layer regions 36 are stacked and at least adjacent ones of the layer regions 36 differ from each other in feature quantities (Step S104).

Then, the second generator 16C generates the third shaping data that includes the second shaping data acquired at Step S100 and the first shaping data generated at Step S104, and that is used for shaping the third solid object 30 in which the first solid object 34 is arranged in the second solid object 32 (Step S106).

The shaping controller 16D outputs the third shaping data of the solid object shaped at Step S106 to the shaping unit 14. In this manner, the shaping controller 16D controls the shaping unit 14 so as to shape the third solid object 30 using the third shaping data (Step S108). Then, this routine ends.

The shaping unit 14 receives the third shaping data, and then, shapes the third solid object 30 according to the third shaping data. Thus, the shaping unit 14 shapes the third solid object 30 in which the first solid object 34 is arranged in the second solid object 32 (refer to FIG. 6, for example).

As described above, the information processing apparatus 12 of the present embodiment includes the first generator 16B, the second generator 16C, and the shaping controller 16D. The first generator 16B generates the first shaping data for shaping the first solid object 34 that represents the identification information for the shaping unit 14 for shaping the solid object, in the form of the three-dimensionally shaped pattern in which the layer regions 36 are stacked and at least adjacent ones of the layer regions 36 differ from each other in feature quantities. The second generator 16C generates the third shaping data that includes the second shaping data for shaping the second solid object 32 serving as the shaping target and also includes the first shaping data, and that is used for shaping the third solid object 30 in which the first solid object 34 is arranged in the second solid object 32. The shaping controller 16D controls the shaping unit 14 so as to shape the third solid object 30 using the third shaping data.

In this manner, the information processing apparatus 12 of the present embodiment generates the third shaping data for shaping the third solid object 30 in which the first solid object 34 is arranged in the second solid object 32. The information processing apparatus 12 then controls the shaping unit 14 so as to shape the third solid object 30 using the third shaping data. The first solid object 34 represents the identification information for the shaping unit 14, in the form of the three-dimensionally shaped pattern in which the layer regions 36 are stacked and at least adjacent ones of the layer regions 36 differ from each other in feature quantities.

As a result, the information processing apparatus 12 of the present embodiment can provide the solid object (third solid object 30) that includes the three-dimensionally shaped pattern that is hardly removable and allows identification of the shaping unit 14.

The third solid object 30 (three-dimensional solid object) shaped according to the third shaping pattern generated by the information processing apparatus 12 of the present embodiment includes the second solid object 32 and the first solid object 34. The first solid object 34 is arranged in the second solid object 32, and represents the identification information for the shaping unit 14 in the form of the three-dimensionally shaped pattern in which the layer regions 36 are stacked and at least adjacent ones of the layer regions 36 differ from each other in feature quantities.

Thus, the third solid object 30 (three-dimensional solid object) of the present embodiment can be provided as the solid object (third solid object 30) that includes the three-dimensionally shaped pattern that is hardly removable and allows the identification of the shaping unit 14.

The above-described feature quantities of each of the layer regions 36 are preferably at least one of the thickness, the mass density, the color density, and the constituent material.

In the embodiment described above, the case has been described in which the types of feature quantities different between adjacent ones of the layer regions 36 in the first solid object 34 are common throughout the first solid object 34. Specifically, in the embodiment described above, the case has been described in which adjacent ones of the layer regions 36 in the first solid object 34 differ from each other in thickness, mass density, color density, or constituent material.

However, adjacent ones of the layer regions 36 in the first solid object 34 only need to differ from each other in at least one of thickness, mass density, color density, and constituent material. In addition, the types of feature quantities different between adjacent ones of the layer regions 36 in one first solid object 34 may differ between pairs of such adjacent ones of the layer regions 36.

For example, of the layer regions 36 in the first solid object 34, one pair of adjacent layer regions 36 (for example, the layer regions $36_1$ and $36_2$) may differ from each other in thickness, and another pair of adjacent layer regions 36 (for example, the layer regions $36_3$ and $36_4$) may differ from each other in mass density. For another example, of the layer regions 36 in the first solid object 34, one pair of adjacent layer regions 36 (for example, the layer regions $36_1$ and $36_2$) may differ from each other in thickness and color density, and another pair of adjacent layer regions 36 (for example, the layer regions $36_3$ and $36_4$) may differ from each other in mass density and constituent material.

The section containing the center position P of the first solid object 34 is preferably constituted by the concentric layer regions 36 centered on the center position P of the first solid object 34.

The outer shape of the first solid object 34 is preferably spherical. The first solid object 34 preferably includes the mark M2 indicating the center position P.

The first solid object 34 may be configured by further including the voids H arranged with spaces therebetween along at least one of boundaries between adjacent ones of the layer regions 36 and an outer circumference of the first solid object 34.

The second generator 16C preferably generates the third shaping data of the third solid object 30 in which the marked portion M1 indicating the cutting position passing through the center position P of the first solid object 34 is provided outside the second solid object 32.

In the present embodiment, the case has been described in which the shaping controller 16D outputs the third shaping data generated by the second generator 16C to the shaping unit 14 without storing the third shaping data in the storage unit 20. However, the second generator 16C may store the generated third shaping data in the storage unit 20 in a corresponding manner to the identification information for the shaping unit 14 that shapes the third solid object 30 according to the third shaping data. When the user has issued a shaping command to the shaping unit 14 through the operating instruction via the UI unit 18, the shaping controller 16D may read the third shaping data corresponding to the identification information for the shaping unit 14 connected to the information processing apparatus 12 from the storage unit 20, and may output the read-out third shaping data to the shaping unit 14.

Second Embodiment

In the present embodiment, the following describes a case of generating the third shaping data of the third solid object 30 in which a plurality of first solid objects 34 are arranged in the second solid object 32.

Figure 8:
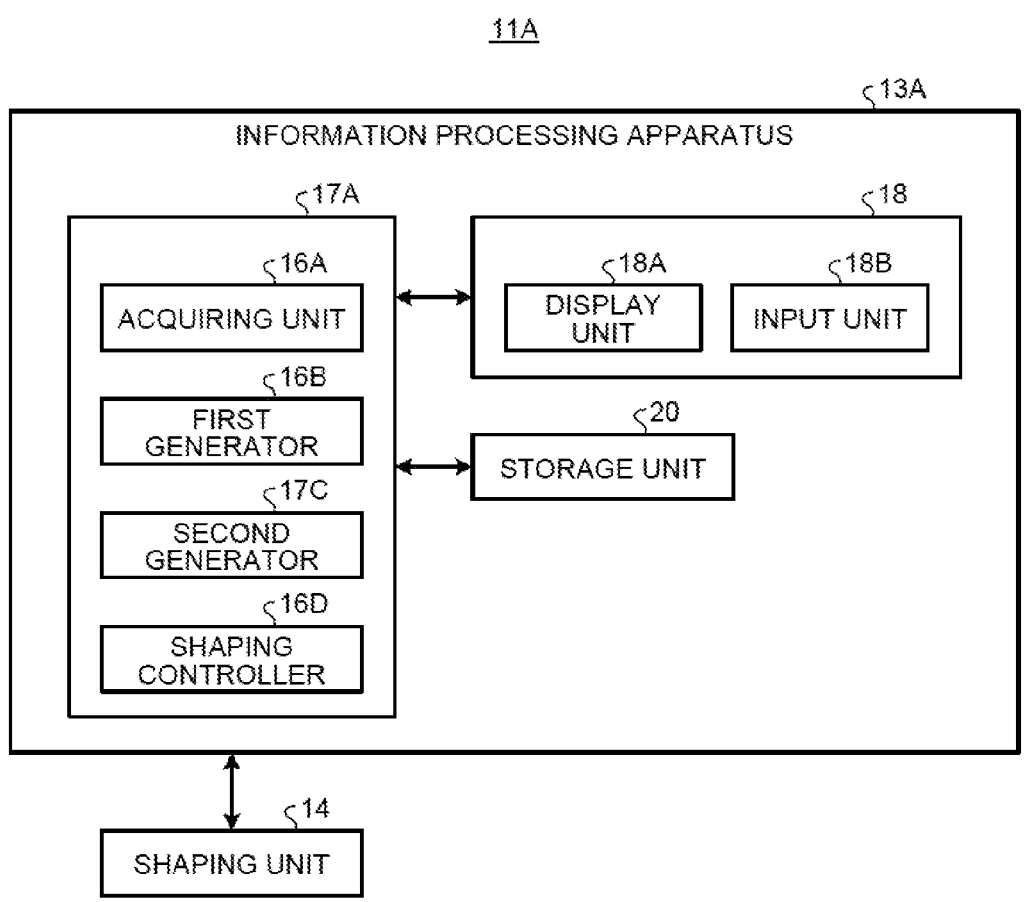

FIG. 8 is a diagram illustrating an example of a shaping system 11A of the present embodiment.

The shaping system 11A includes an information processing apparatus 13A and the shaping unit 14. The information processing apparatus 13A and the shaping unit 14 are connected so as to be capable of transmitting and receiving data and signals to and from each other. The shaping unit 14 is the same as that of the first embodiment.

The information processing apparatus 13A creates shaping data to be used by the shaping unit 14, and controls the shaping unit 14.

The information processing apparatus 13A includes a control unit 17A, the UI unit 18, and the storage unit 20. The control unit 17A is connected to the UI unit 18 and the storage unit 20 so as to be capable of transmitting and receiving signals and data to and from the units 18 and 20. The UI unit 18 and the storage unit 20 are the same as those of the first embodiment.

The control unit 17A includes the acquiring unit 16A, the first generator 16B, a second generator 17C, and the shaping controller 16D. One, some, or all of the acquiring unit 16A, the first generator 16B, the second generator 17C, and the shaping controller 16D may be implemented by causing a processing device, such as the CPU, to execute a computer program, that is, by software, or may be implemented by hardware, such as the integrated circuit (IC), or may otherwise be implemented by using both software and hardware.

The acquiring unit 16A, the first generator 16B, and the shaping controller 16D are the same as those of the first embodiment.

The second generator 17C generates the third shaping data of the third solid object 30 in which the first solid objects 34 are arranged in the second solid object 32. The first solid objects 34 and the second solid object 32 are the same as those of the first embodiment. In the present embodiment, the second generator 17C generates the third shaping data of the solid object in which the first solid objects 34 are arranged in the second solid object 32.

Figure 9:
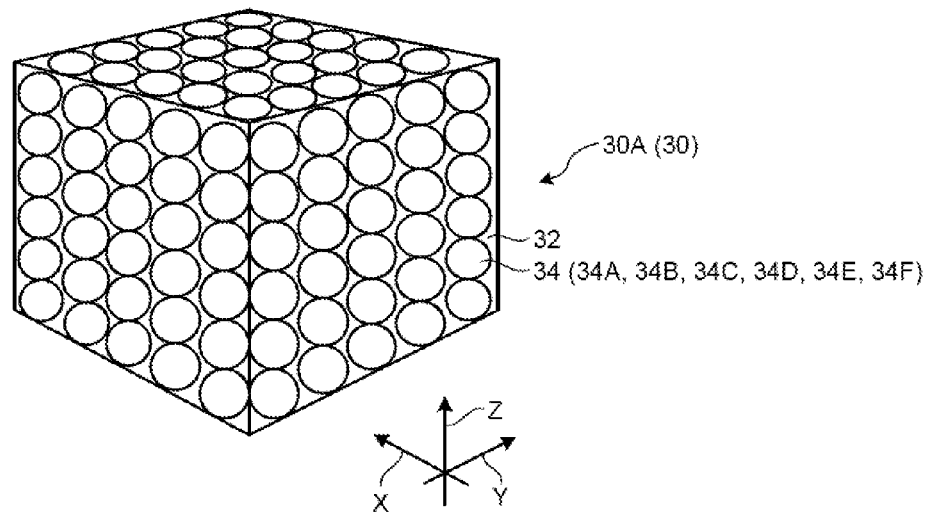
FIG. 9 illustrates another example of the third solid object.

FIG. 9 illustrates an example of the third solid object 30 (third solid object 30A) of the present embodiment. The third solid object 30A is a solid object in which the first solid objects 34 are arranged in the second solid object 32.

The example illustrated in FIG. 9 represents a case in which a plurality of array layers each obtained by arranging the first solid objects 34 toward two mutually orthogonal directions (for example, toward the X- and Y-directions in FIG. 9) are arranged by being stacked in layers toward a direction orthogonal to the two directions (for example, toward the Z-direction in FIG. 9) so as to fill the inside of the second solid object 32.

In this case, the second generator 17C only needs to generate the third shaping data of the third solid object 30A in which the first solid objects 34 are arranged by being stacked in layers in the second solid object 32.

The third solid object 30A only needs to be a solid object in which the first solid objects 34 are arranged in the second solid object 32, and is not limited to have the form illustrated in FIG. 9.

The form of each of the first solid objects 34 arranged in the second solid object 32 may be any of the forms of the first solid objects 34A to 34F described in the first embodiment. Each of the first solid objects 34 arranged in the second solid object 32 preferably has one of the forms of the first solid objects 34A to 34F. In other words, every one of the first solid objects 34 arranged in the second solid object 32 is preferably, for example, the first solid object 34 exemplified by the first solid object 34A. The first solid objects 34 arranged in the second solid object 32 may have at least two mixed forms among those of the first solid objects 34A to 34F.

The identification information for the shaping unit 14 may be represented in the form of the three-dimensionally shaped pattern according to both the feature quantities of the layer regions 36 in the first solid objects 34 and the arrangement rule of the first solid objects 34 arranged in the second solid object 32.

Figure 10:
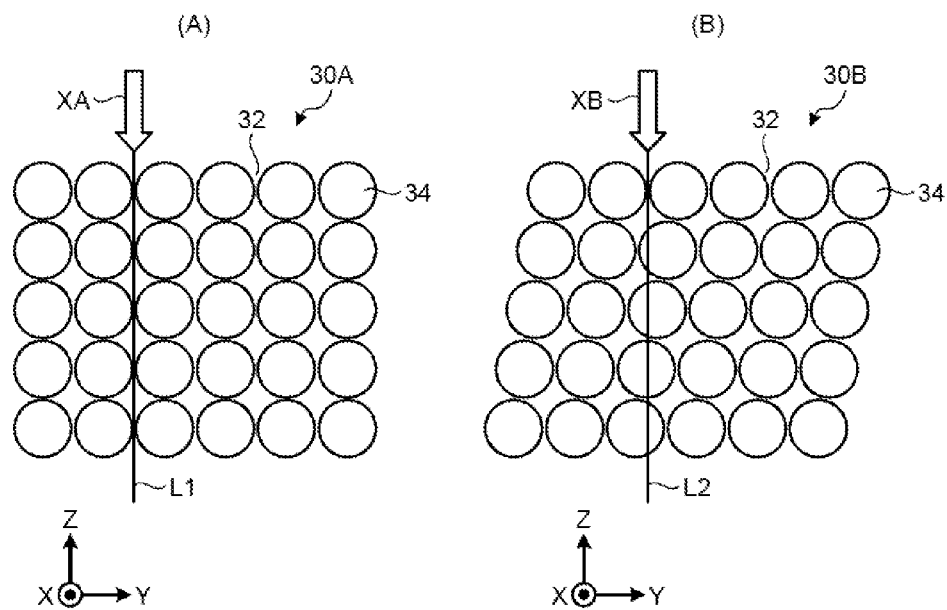
FIG. 10 illustrates examples of a plurality of such first solid objects arranged in a second solid object.

FIG. 10 illustrates examples of the first solid objects 34 arranged in the second solid object 32.

As described above, the cut surface obtained by cutting through the center position P of the first solid objects 34 is read by the visually recognizing user, or by the mechanically recognizing detection unit. In this manner, the identification information for the shaping unit 14 represented by the three-dimensionally shaped pattern of the first solid objects 34 is recognized. For this purpose, when the second solid object 32 is cut, at least one of the first solid objects 34 contained inside is preferably cut along a section passing through the center position P.

For example, suppose, as illustrated in (A) in FIG. 10, that the first solid objects 34 contained in the second solid object 32 are stacked (arranged) along mutually orthogonal stacking directions (refer to the directions of arrow X, arrow Y, and arrow Z in (A) in FIG. 10).

In this case, if the second solid object 32 is cut in the direction of arrow XA along a cut surface L1 passing between the first solid objects 34, the second solid object 32 is not cut in some cases. Also, in this case, there is a high probability that none of the first solid objects 34 contained in the second solid object 32 is cut through the center position P.

To avoid these problems, the first solid objects 34 contained in the second solid object 32 are preferably arranged so as to be shifted in a direction intersecting at least one of the mutually orthogonal stacking directions (refer to the directions of arrow X, arrow Y, and arrow Z in (A) in FIG. 10) (refer to (B) in FIG. 10, for example). In this case, the second generator 17C only needs to generate the third shaping data of a third solid object 30B in which the first solid objects 34 in the second solid object 32 are arranged so as to be shifted in a direction intersecting at least one of the mutually orthogonal stacking directions (refer to (B) in FIG. 10).

In this case, for example, when the second solid object 32 is cut at any location, at least one of the first solid objects 34 contained in the second solid object 32 is probably cut through the center position P. Specifically, when, for example, the third solid object 30B is cut in the direction of arrow XB along a cut surface L2 as illustrated in (B) in FIG. 10, at least one of the first solid objects 34 stacked in a plurality of layers is probably cut through the center position P.

Thus, the second generator 17C preferably generates the third shaping data of the third solid object 30B in which first solid objects 34 are arranged in the second solid object 32 so as to be shifted in a direction intersecting at least one of the mutually orthogonal stacking directions.

The examples illustrated in FIGS. 9 and 10 represent the case in which the third solid object 30 has the configuration in which the first solid objects 34 are stacked (arranged) along the mutually orthogonal stacking directions.

However, the first solid objects 34 contained in the second solid object 32 may be arranged at random in the second solid object 32.

Figure 11:
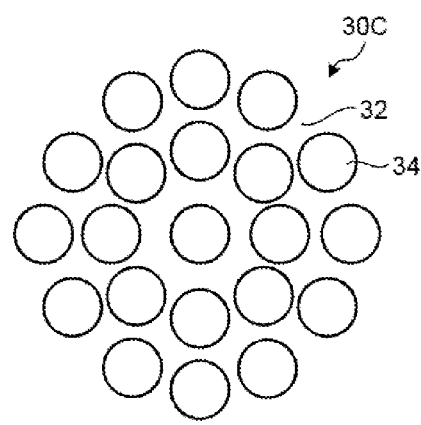
FIG. 11 illustrates another example of the first solid objects arranged in the second solid object.

FIG. 11 illustrates another example of the first solid objects 34 arranged in the second solid object 32. As illustrated in FIG. 11, the first solid objects 34 contained in the second solid object 32 may be configured such that the first solid objects 34 are arranged so as to radially spread with spaces therebetween in a centered manner on one of the first solid objects 34. In other words, the third solid object 30 may be configured as a third solid object 30C in which the first solid objects 34 are arranged in a three-dimensional spherical shape in the second solid object 32.

Referring back to FIG. 8, the shaping controller 16D controls the shaping unit 14 so as to shape the third solid object 30 (such as the third solid object 30A, 30B, or 30C) using the third shaping data generated by the second generator 17C.

The shaping unit 14 receives the third shaping data, and then, shapes the third solid object 30 (such as the third solid object 30A, 30B, or 30C) represented by the third shaping data.

Figure 12:
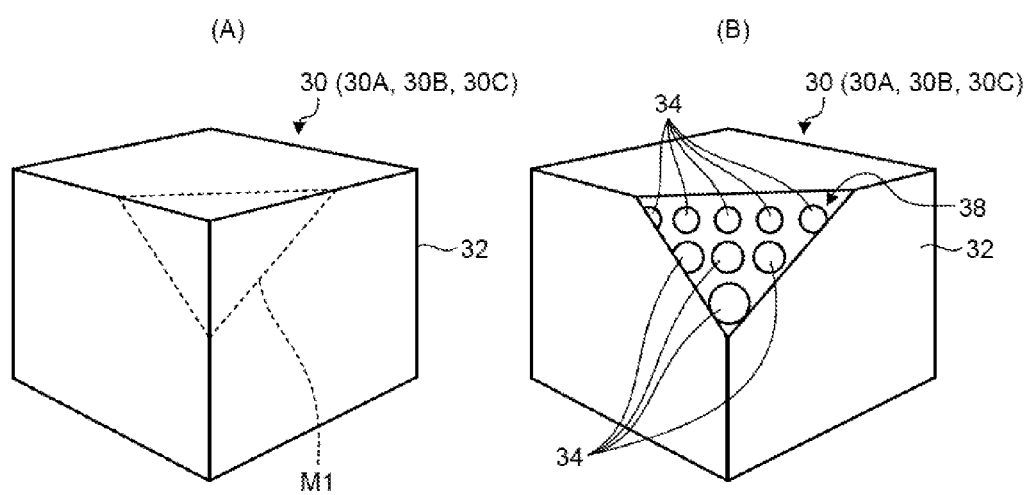
FIG. 12 illustrates still another example of the third solid object.

Thus, for example, the third solid object 30 (third solid object 30A, 30B, or 30C) illustrated in FIG. 12 is shaped. FIG. 12 illustrates still another example of the third solid object 30.

Suppose that the shaping controller 16D generates the third solid object 30 illustrated in (A) in FIG. 12. In this case, the third solid object 30 is cut when the three-dimensionally shaped pattern is visually recognized or read (refer to (B) in FIG. 12, for example). This cutting externally exposes sections of the first solid objects 34 arranged in the second solid object 32. In the present embodiment, the first solid objects 34 are arranged in the second solid object 32. Hence, the sections of the first solid objects 34 are exposed on a section 38 of the second solid object 32.

An outer surface of the second solid object 32 is preferably provided with the marked portion M1 indicating the cutting position passing through the center position P of at least one of the first solid objects 34. In this case, the second generator 17C only needs to generate the third shaping data of the third solid object 30 in which the marked portion M1 indicating the cutting position passing through the center position P of at least one of the first solid objects 34 is provided outside the second solid object 32.

Providing the marked portion M1 can give the user information on the cutting position passing through the center position P of the first solid object 34 contained inside in an easily understandable manner.

The procedure of information processing performed by the information processing apparatus 13A of the present embodiment is the same as that of the first embodiment except in that the second generator 17C, instead of the second generator 16C, generates the third shaping data.

As described above, in the present embodiment, the information processing apparatus 13A includes the first generator 16B, the second generator 17C, and the shaping controller 16D. The first generator 16B generates the first shaping data for shaping the first solid objects 34 that represent the identification information for the shaping unit 14 for shaping the solid object, in the form of the three-dimensionally shaped pattern in which the layer regions 36 are stacked and at least adjacent ones of the layer regions 36 differ from each other in feature quantities. The second generator 17C generates the third shaping data that includes the second shaping data for shaping the second solid object 32 serving as the shaping target and also includes the first shaping data, and that is used for shaping the third solid object 30 in which the first solid objects 34 are arranged in the second solid object 32. The shaping controller 16D controls the shaping unit 14 so as to shape the third solid object 30 using the third shaping data.

Thus, in the same manner as in the first embodiment, the information processing apparatus 13A of the present embodiment can provide the solid object (third solid object 30) that includes the three-dimensionally shaped pattern that is hardly removable and allows the identification of the shaping unit 14.

In the present embodiment, the third solid object 30 has the configuration in which the first solid objects 34 are arranged in the second solid object 32. This configuration causes the section passing through the center position P of at least one of the first solid objects 34 to be exposed if the third solid object 30 is cut when the three-dimensionally shaped pattern is visually recognized or read. As a result, the third solid object 30 can be provided in which the three-dimensionally shaped pattern can be more easily checked than that of the first embodiment when the three-dimensionally shaped pattern is visually recognized or read.

The marked portion M1 is provided on the second solid object 32 of the third solid object 30. When the three-dimensionally shaped pattern of the first solid objects 34 is visually recognized or read, cutting the second solid object 32 along the marked portion M1 allows at least one of the first solid objects 34 to be cut along a section passing through the center position P.

Third Embodiment

In the present embodiment, the following describes a shaping system further including a detection unit 40 for detecting the three-dimensionally shaped pattern.

Figure 13:
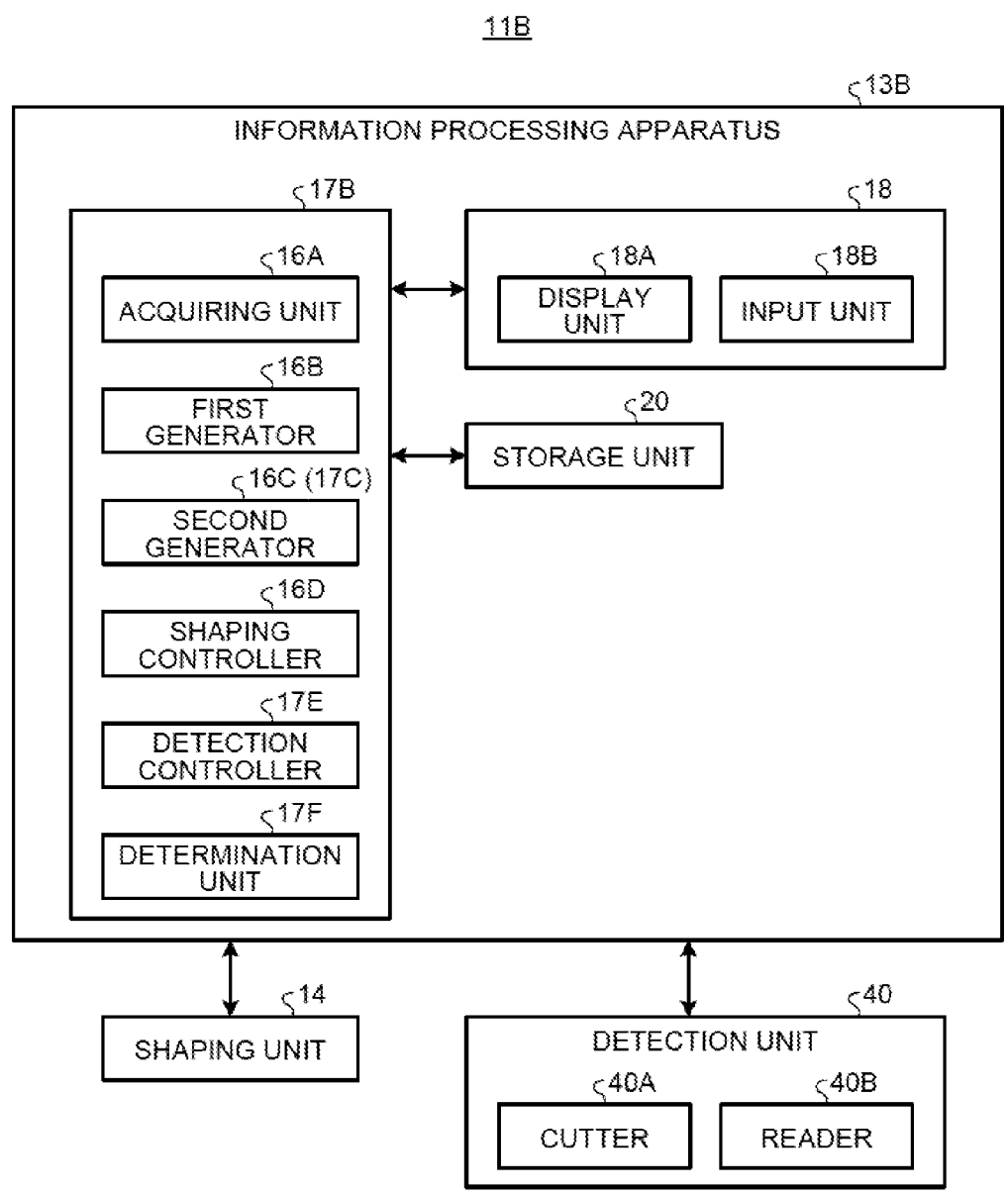
FIG. 13 is a diagram illustrating an example of still another shaping system.

FIG. 13 is a diagram illustrating an example of a shaping system 11B of the present embodiment.

The shaping system 11B includes an information processing apparatus 13B, the shaping unit 14, and the detection unit 40. The information processing apparatus 13B is connected to the shaping unit 14 and the detection unit 40 so as to be capable of transmitting and receiving data and signals to and from the units 14 and 40. The shaping unit 14 is the same as that of the first embodiment.

The detection unit 40 is a device for cutting the third solid object 30 and reading the three-dimensionally shaped pattern represented by the first solid objects 34. Specifically, the detection unit 40 includes a cutter 40A and a reader 40B.

The cutter 40A cuts the third solid object 30. The cutter 40A only needs to include a known cutting mechanism that can cut the third solid object 30. If an outer circumference of the second solid object 32 is provided with the marked portion M1, the cutter 40A cuts the third solid object 30 along the marked portion M1. In this case, the cutter 40A only needs to include a detector for detecting the marked portion M1 on the outer circumference of the third solid object 30 and a cutting mechanism for cutting the third solid object 30 along the marked portion M1 detected by the detector. For example, a known photographing device should be used as the detector.

The reader 40B reads a cut surface of one of the first solid objects 34 cut through the center position P among cut surfaces of the first solid objects 34 on the cut surface of the third solid object 30. For example, the reader 40B stores in advance the mark M2 indicating the center position P. Then, the reader 40B only needs to detect the mark M2 on the cut surface of the third solid object 30, and read the cut surface of the first solid object 34 having the detected mark M2 in the center position P. The reader 40B may obtain information indicating the mark M2 from the information processing apparatus 13B, and use the information for the detection.

The reader 40B only needs to be a device that can identify the feature quantities different between adjacent ones of the layer regions 36 in the first solid object 34 serving as a detection target. For example, if one of the types of feature quantities different between adjacent ones of the layer regions 36 is the color density, a known photographing device, for example, should be used as the reader 40B. Alternatively, for example, if one of the types of feature quantities different between adjacent ones of the layer regions 36 is the constituent material, a device that can detect differences in constituent material such as an X-ray analyzer), for example, should be used as the reader 40B. The reader 40B of the detection unit 40 may be replaceable with the reader 40B that can read different feature quantities, depending on the types of feature quantities different between adjacent ones of the layer regions 36 in the first solid object 34 serving as the detection target.

In the present embodiment, as an example, a case will be described in which one of the types of feature quantities different between adjacent ones of the layer regions 36 in the first solid object 34 is the color density. In this case, the reader 40B reads the section of the first solid object 34 obtained by cutting through the section containing the center position P, and transmits the reading results to the information processing apparatus 13B.

The information processing apparatus 13B includes a control unit 17B, the UI unit 18, and the storage unit 20. The control unit 17B is connected to the UI unit 18 and the storage unit 20 so as to be capable of transmitting and receiving data and signals to and from the units 18 and 20. The UI unit 18 and the storage unit 20 are the same as those of the first embodiment.

The control unit 17B includes the acquiring unit 16A, the first generator 16B, the second generator 16C or 17C, the shaping controller 16D, a detection controller 17E, and a determination unit 17F. One, some, or all of the acquiring unit 16A, the first generator 16B, the second generator 16C or 17C, the shaping controller 16D, the detection controller 17E, and the determination unit 17F may be implemented by causing a processing device, such as the CPU, to execute a computer program, that is, by software, or may be implemented by hardware, such as the IC, or may otherwise be implemented by using both software and hardware.

The acquiring unit 16A, the first generator 16B, the second generator 16C, the second generator 17C, and the shaping controller 16D are the same as those of the first and second embodiments.

The detection controller 17E controls the detection unit 40. For example, when the user has issued a detection command through the operating instruction via the UI unit 18, the detection controller 17E controls the detection unit 40 so as to detect the three-dimensionally shaped pattern of the first solid object 34 contained in the third solid object 30.

According to the control by the detection controller 17E, the detection unit 40 uses the cutter 40A to cut the third solid object 30 serving as a detection target, and uses the reader 40B to read the section of the first solid object 34 obtained by cutting through the section containing the center position P. The reader 40B outputs the reading results as the three-dimensionally shaped pattern to the information processing apparatus 13B.

The determination unit 17F receives the reading results of the section of the first solid object 34 from the detection unit 40. The determination unit 17F analyze the received reading results, and obtains the number of layers of the layer regions 36, the shapes of the layer regions 36, the types of feature quantities different between adjacent ones of the layer regions 36, and the feature quantities of the layer regions 36 in the first solid object 34, and the sizes of the first solid object 34.

Then, the determination unit 17F determines whether the obtained results agree with the number of layers of the layer regions 36, the shapes of the layer regions 36, the types of feature quantities different between adjacent ones of the layer regions 36, the feature quantities of the layer regions 36, and the sizes of the first solid object 34 in the first information stored in the storage unit 20 that are associated with the identification information for the shaping unit 14 that has shaped the third solid object 30 serving as the detection target. In this manner, the determination unit 17F determines whether the third solid object 30 serving as the detection target is a solid object shaped by the particular shaping unit 14.

Then, the determination unit 17F outputs the determination result to the UI unit 18 (display unit 18A). The determination unit 17F may store the determination result in the storage unit 20, or may transmit the determination result to an external device.

Figure 14:
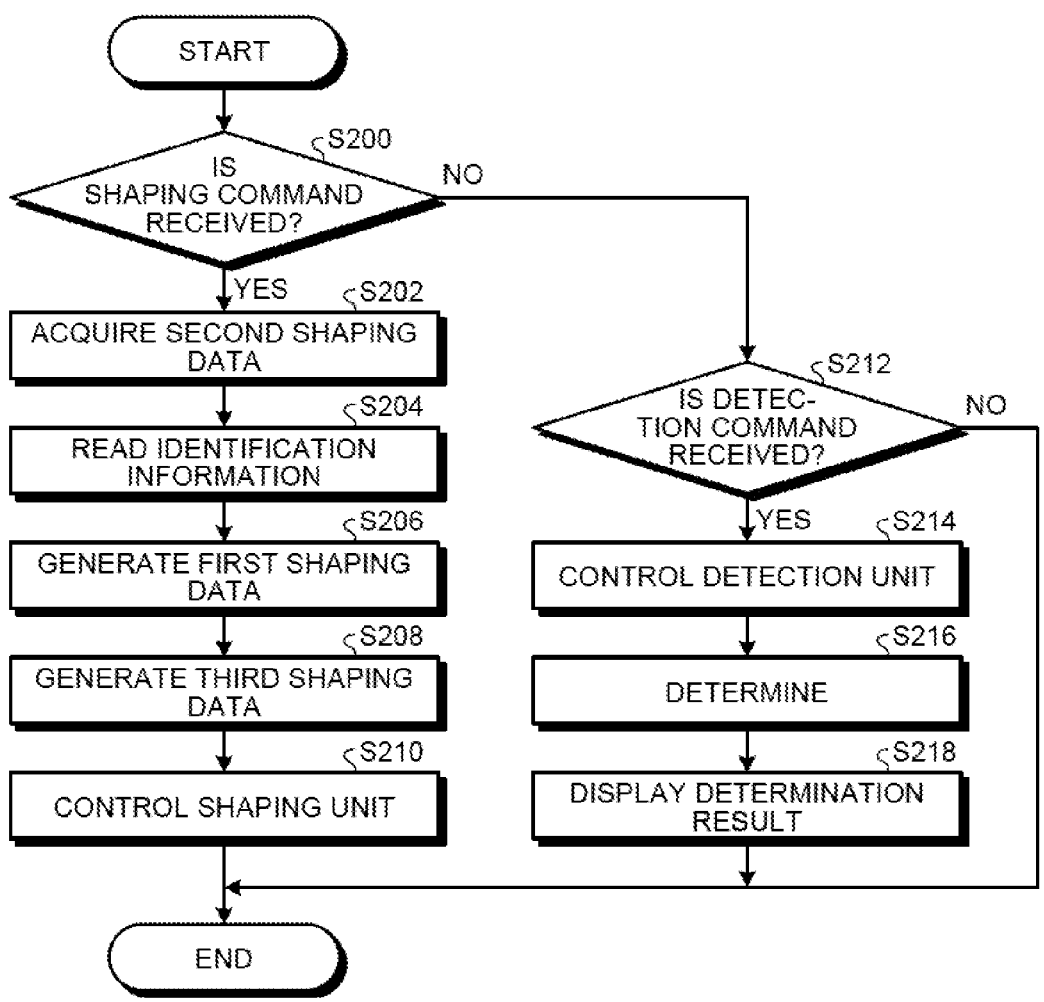
FIG. 14 is a flowchart illustrating an example of another procedure of the image processing.

The following describes a procedure of information processing performed by the information processing apparatus 13B. FIG. 14 is a flowchart illustrating an example of the procedure of the image processing performed by the information processing apparatus 13B.

First, the control unit 17B determines whether the shaping command is received from the UI unit 18 (Step S200). The user enters the shaping command via the UI unit 18 to shape a solid object. If the shaping command is received from the UI unit 18 (Yes at Step S200), the control unit 17B performs processing at Step S202. Then, the control unit 17B performs processing of Steps S202 to S210 in the same manner as Steps S100 to S108 of the first embodiment (refer to FIG. 7).

Specifically, the acquiring unit 16A acquires the second shaping data (Step S202). Then, the first generator 16B reads the identification information for the shaping unit 14 from the storage unit 20 (Step S204). The first generator 16B then generates the first shaping data for shaping the first solid object 34 that represents the identification information read at Step S204 in the form of the three-dimensionally shaped pattern in which the layer regions 36 are stacked and at least adjacent ones of the layer regions 36 differ from each other in feature quantities (Step S206).

Then, the second generator 16C or 17C generates the third shaping data that includes the second shaping data acquired at Step S202 and the first shaping data generated at Step S206, and that is used for shaping the third solid object 30 in which one or more first solid objects 34 are arranged in the second solid object 32 (Step S208).

The shaping controller 16D outputs the third shaping data of the solid object shaped at Step S208 to the shaping unit 14. In this manner, the shaping controller 16D controls the shaping unit 14 so as to shape the third solid object 30 using the third shaping data (Step S210). Then, this routine ends.

If the determination result at Step S200 is negative (No at Step S200), the control unit 17B performs processing at Step S212.

At Step S212, the detection controller 17E determines whether the detection command is received from the UI unit 18 (Step S212). If the determination result at Step S212 is negative (No at Step S212), this routine ends. If the determination result at Step S212 is affirmative (Yes at Step S212), the detection controller 17E performs processing at Step S214.

At Step S214, the detection controller 17E controls the detection unit 40 so as to detect the three-dimensionally shaped pattern contained in the third solid object 30 (Step S214). The process of Step S214 causes the detection unit 40 to cut the third solid object 30 serving as the detection target, and to transmit the reading results of the cut surface passing through the center position P of the first solid object 34 as the three-dimensionally shaped pattern to the control unit 17B.

Then, the determination unit 17F receives the reading results of the section of the first solid object 34 from the detection unit 40. The determination unit 17F determines whether the third solid object 30 serving as the detection target is a solid object shaped by the particular shaping unit 14 (Step S210).

Then, the determination unit 17F outputs (displays) the determination result to (on) the display unit 18A (Step S218). Then, this routine ends.

As described above, in the present embodiment, the shaping system 11B is configured by further including the detection controller 17E, the determination unit 17F, and the detection unit 40 in the shaping system 10 or 11A of the first or second embodiment.

The determination unit 17F receives the reading results of the section of the first solid object 34 from the detection unit 40. The determination unit 17F determines whether the third solid object 30 serving as the detection target is a solid object shaped by the particular shaping unit 14.

The reading results by the detection unit 40 that are used as a target of the determination by the determination unit 17F correspond to the reading results of the cut surface passing through the center position P of the first solid object 34 contained in the third solid object 30. In other words, the reading results by the detection unit 40 correspond to the three-dimensionally shaped pattern represented by the first solid object 34.

Therefore, the information processing apparatus 13B of the present embodiment uses the first solid object 34 described in the first and second embodiments to determine the identification information for the shaping unit 14 that has shaped the third solid object 30. In this manner, the three-dimensionally shaped pattern cannot be identified without reading the cut surface passing through the center position P of the first solid object 34, and is hardly removable from the third solid object 30.

Accordingly, in addition to providing the effects of the first and second embodiments, the information processing apparatus 13B of the present embodiment uses the solid object that includes the three-dimensionally shaped pattern that is hardly removable and allows the identification of the shaping unit 14, and can determine whether a solid object is the third solid object 30 produced by the particular shaping unit 14.

In the present embodiment, the case has been described in which the control unit 17B includes the detection controller 17E and the determination unit 17F. The control unit 17B may, however, have a configuration in which at least either of the detection controller 17E and the determination unit 17F is provided in the detection unit 40.

In the present embodiment, the configuration has been described in which the information processing apparatus 13B, the shaping unit 14, and the detection unit 40 are provided separately from one another. However, at least two of the information processing apparatus 13B, the shaping unit 14, and the detection unit 40 may be configured in an integrated manner.

Fourth Embodiment

The following describes a hardware configuration of the information processing apparatuses 12, 13A, and 13B in the embodiments described above.

Figure 15:
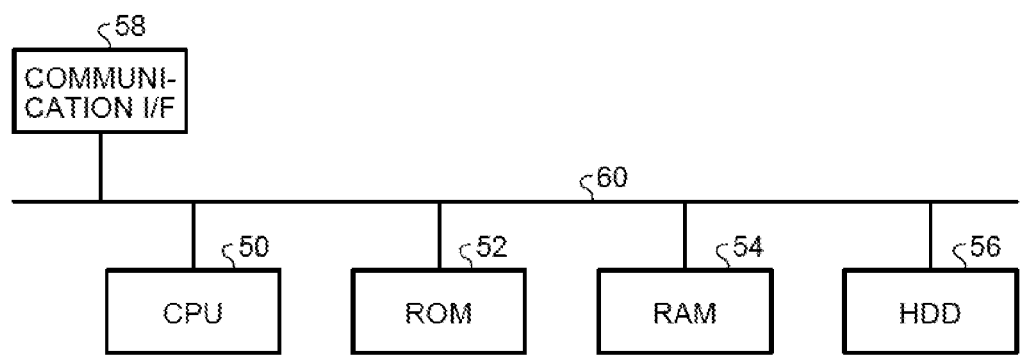
FIG. 15 is a diagram illustrating an example of a hardware configuration of information processing apparatuses.

FIG. 15 is a diagram illustrating an example of the hardware configuration of the information processing apparatuses 12, 13A, and 13B in the embodiments described above.

Each of the information processing apparatuses 12, 13A, and 13B in the embodiments described above includes a CPU 50, a read-only memory (ROM) 52, a random access memory (RAM) 54, a hard disk drive (HDD) 56, and a communication interface (I/F) 58. The CPU 50, the ROM 52, the RAM 54, the HDD 56, and the communication I/F 58 are connected to one another through a bus 60, thus providing the hardware configuration using an ordinary computer.

Programs for executing the various processes described above on each of the information processing apparatuses 12, 13A, and 13B in the embodiments described above are provided by being incorporated in advance into, for example, a ROM.

The programs for executing the various processes described above on each of the information processing apparatuses 12, 13A, and 13B in the embodiments described above may be configured to be recorded and provided as files in a format installable in or executable on these apparatuses in a computer-readable storage medium, such as a CD-ROM, a flexible disk (FD), a CD-R, and a digital versatile disc (DVD).

The programs for executing the various processes described above on each of the information processing apparatuses 12, 13A, and 13B in the embodiments described above may be configured to be stored in a computer connected to a network, such as the Internet, and provided by being downloaded through the network. The programs for executing the various processes described above on each of the information processing apparatuses 12, 13A, and 13B in the embodiments described above may be configured to be provided or distributed through the network, such as the Internet.

The programs for executing the various processes described above on each of the information processing apparatuses 12, 13A, and 13B in the embodiments described above have a modular configuration including the above-described components (the acquiring unit 16A, the first generator 16B, the second generator 16C, the second generator 17C, the shaping controller 16D, the detection controller 17E, and the determination unit 17F). As actual hardware, the CPU reads each of the programs from a storage medium, such as the ROM, and executes the program to load the above-mentioned components in the main memory, so that the components are generated in the main memory.

Provided may be a non-transitory computer-readable storage medium with an executable program stored thereon and executed by a computer. The program instructs the computer to perform: generating first shaping data for shaping a first solid object representing identification information for a shaping unit that shapes a solid object, in a form of a three-dimensionally shaped pattern in which a plurality of layer regions are stacked and at least adjacent ones of the layer regions differ from each other in feature quantities; generating third shaping data that includes second shaping data for shaping a second solid object serving as a shaping target and also includes the first shaping data, and that is used for shaping a third solid object in which the first solid object is arranged in the second solid object; and controlling the shaping unit to shape the third solid object using the third shaping data.

According to the embodiments described above, it is possible to provide an effect of being capable of providing a solid object that includes a three-dimensionally shaped pattern that is hardly removable and allows identification of a shaping unit that has shaped the solid object.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a first generator configured to generate first shaping data to be provided to a shaping unit for forming a solid object of a specified shape, for the shaping unit to form a first solid object, the solid object formed by the shaping unit being a three-dimensionally shaped solid object formed by a plurality of layer regions stacked one on another, and in the first solid object, identification information for the shaping unit being represented by differences in feature quantities of at least one pair of adjacent layer regions amongst the plurality of layer regions of the first solid object;
a second generator configured to generate third shaping data that includes (i) second shaping data for forming a second solid object and (ii) the first shaping data, the third shaping data being used for forming a third solid object in which the first solid object is arranged in the second solid object; and
a shaping controller configured to control the shaping unit to form the third solid object using the third shaping data, the shaping unit to form the third solid object being identifiable based on the identification information represented by the differences in feature quantities of said at least one pair of adjacent layer regions amongst the plurality of layer regions of the first solid object,
wherein the first solid object includes a mark indicating a center position of the first solid object,
wherein on the third solid object, a marked portion, differing in feature quantities from those of a portion of the second solid object adjacent to the marked portion, is provided external to the first solid object and outside the second solid object, indicating a cutting position for a cut passing through (a) the marked portion and (b) the mark indicating the center position of the first solid object, and
wherein the differences in said feature quantities of said at least one pair of adjacent layer regions are identifiable on a cross section of the first solid object appearing when the third solid object is cut together with the first solid object through (a) said marked portion external to the first solid object and outside the second solid object, and (b) said mark indicating the center position of the first solid object.

2. The information processing apparatus according to claim 1, wherein a section containing a center position of the first solid object is made up of the layer regions concentrically centered on the center position.

3. The information processing apparatus according to claim 1, wherein the first solid object has a spherical outer shape.

4. The information processing apparatus according to claim 1, wherein the first solid object includes a plurality of voids arranged with spaces therebetween along at least one of boundaries between adjacent ones of the layer regions and an outer circumference of the first solid object.

5. The information processing apparatus according to claim 1, wherein the second generator generates the third shaping data of the third solid object in which a plurality of the first solid objects are arranged in the second solid object.

6. The information processing apparatus according to claim 5, wherein the second generator generates the third shaping data of the third solid object in which the first solid objects are arranged by being stacked in layers in the second solid object.

7. The information processing apparatus according to claim 6, wherein the second generator generates the third shaping data of the third solid object in which the first solid objects in the second solid object are arranged so as to be shifted in a direction intersecting at least one of a plurality of mutually orthogonal stacking directions.

8. The information processing apparatus according to claim 1, wherein in a case that the first generator determines that the shaping unit is incapable of forming the differences in a selected type of feature quantities of said at least one pair of adjacent layer regions, to represent the identification information, the first generator determines an other type of feature quantities for which the shaping unit is capable of forming differences in said other type of feature quantities of said at least one pair of adjacent layers of the first solid object, and generates the first shaping data, which is to be employed by the shaping unit to form the first solid object representing the identification information for the shaping unit, in accordance with said other type of feature quantities for which the shaping unit is capable of forming differences in said other type of feature quantities of said at least one pair of adjacent layers of the first solid object, and the shaping controller controls the shaping unit to form the first solid object using the first shaping data generated in accordance with said other type of feature quantities for which the shaping unit is capable of forming differences in said other type of feature quantities of said at least one pair of adjacent layers of the first solid object.

9. The information processing apparatus according to claim 1, wherein the center position of the first solid object is inside the first solid object and is central within the first solid object in each of three mutually orthogonal directions.

10. An information processing method comprising:

generating first shaping data, to be provided to a shaping unit for forming a solid object of a specified shape, for the shaping unit to form a first solid object, the solid object formed by the shaping unit being a three-dimensionally shaped solid object formed by a plurality of layer regions stacked one on another, and in the first solid object, identification information for the shaping unit being represented by differences in feature quantities of at least one pair of adjacent layer regions amongst the plurality of layer regions of the first solid object;

generating third shaping data that includes (i) second shaping data for forming a second solid object and (ii) the first shaping data, the third shaping data being used for forming a third solid object in which the first solid object is arranged in the second solid object;

controlling the shaping unit to form the third solid object using the third shaping data, the shaping unit to form the third solid object being identifiable based on the identification information represented by the differences in feature quantities of said at least one pair of adjacent layer regions amongst the plurality of layer regions of the first solid object, wherein the first solid object includes a mark indicating a center position of the first solid object, wherein on the third solid object, a marked portion, differing in feature quantities from those of a portion of the second solid object adjacent to the marked portion, is provided external to the first solid object and outside the second solid object, indicating a cutting position for a cut passing through (a) the marked portion and (b) the mark indicating the center position of the first solid object, and wherein the differences in said feature quantities of said at least one pair of adjacent layer regions are identifiable on a cross section of the first solid object appearing when the third solid object is cut together with the first solid object through (a) said marked portion external to the first solid object and outside the second solid object, and (b) said mark indicating the center position of the first solid object.

11. The information processing method according to claim 10, further comprising determining that the shaping unit is incapable of forming the differences in a selected type of feature quantities of said at least one pair of adjacent layer regions, to represent the identification information;

determining an other type of feature quantities for which the shaping unit is capable of forming differences in said other type of feature quantities of said at least one pair of adjacent layers of the first solid object, and generating the first shaping data, which is to be employed by the shaping unit to form the first solid object representing the identification information for the shaping unit, in accordance with said other type of feature quantities for which the shaping unit is capable of forming differences in said other type of feature quantities of said at least one pair of adjacent layers of the first solid object; and controlling the shaping unit to form the first solid object using the first shaping data generated in accordance with said other type of feature quantities for which the shaping unit is capable of forming differences in said other type of feature quantities of said at least one pair of adjacent layers of the first solid object.

12. A three-dimensional solid object comprising:

a second solid object; and a first solid object that is arranged in the second solid object and is a three-dimensionally shaped solid object formed by a plurality of layer regions stacked one on another by a forming unit, and in the first solid object, identification information for a shaping unit being represented by differences in feature quantities of at least one pair of adjacent layer regions amongst the plurality of layer regions of the first solid object, the shaping unit that forms the three-dimensional solid object being identifiable based on the identification information represented by the differences in feature quantities of said at least one pair of adjacent layer regions amongst the plurality of layer regions of the first solid object, wherein the first solid object includes a mark indicating a center position of the first solid object, wherein on the three-dimensional solid object, a marked portion, differing in feature quantities from those of a portion of the second solid object adjacent to the marked portion, is provided external to the first solid object and outside the second solid object, indicating a cutting position for a cut passing through (a) the marked portion and (b) the mark indicating the center position of the first solid object, and wherein the differences in said feature quantities of said at least one pair of adjacent layer regions are identifiable on a cross section of the first solid object appearing when the third solid object is cut together with the first solid object through (a) said marked portion external to the first solid object and outside the second solid object, and (b) said mark indicating the center position of the first solid object.

* * * * *